G. Dunham. Sheet 1. 2 Sheets.
Mach. for Making Nuts.
No. 2324. Reissued Jul. 31. 1866.
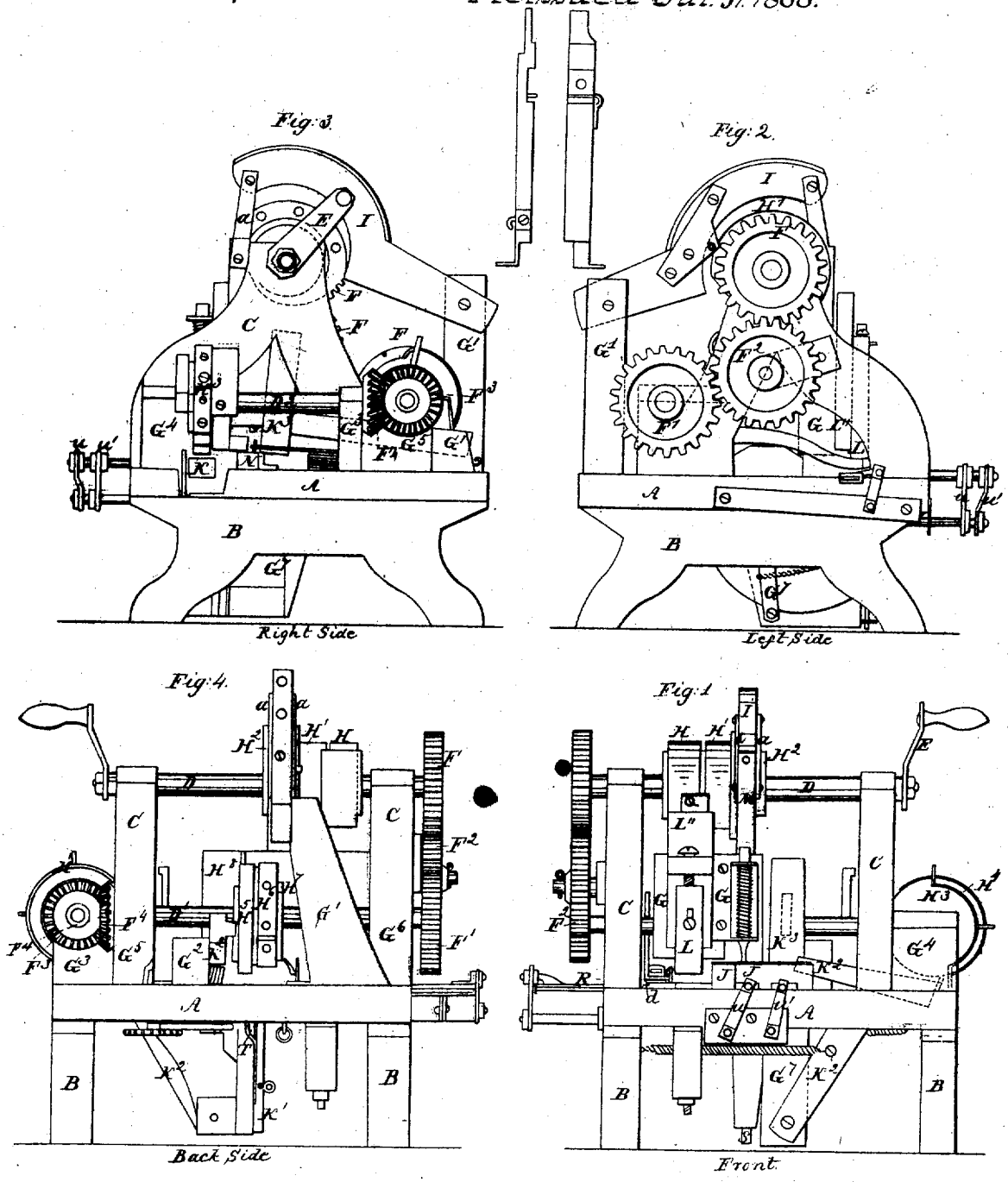
Witnesses;
E. W. Beiß
Jeremy W. Bell
Inventor;
George Dunham.

G. Dunham. Sheet 2. 2 Sheets.
Mach for Making Nuts.
No. 2324. Reissued Jul. 31. 1866.
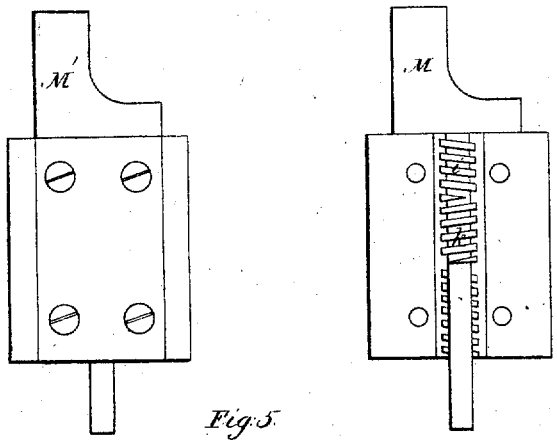
Fig. 5.
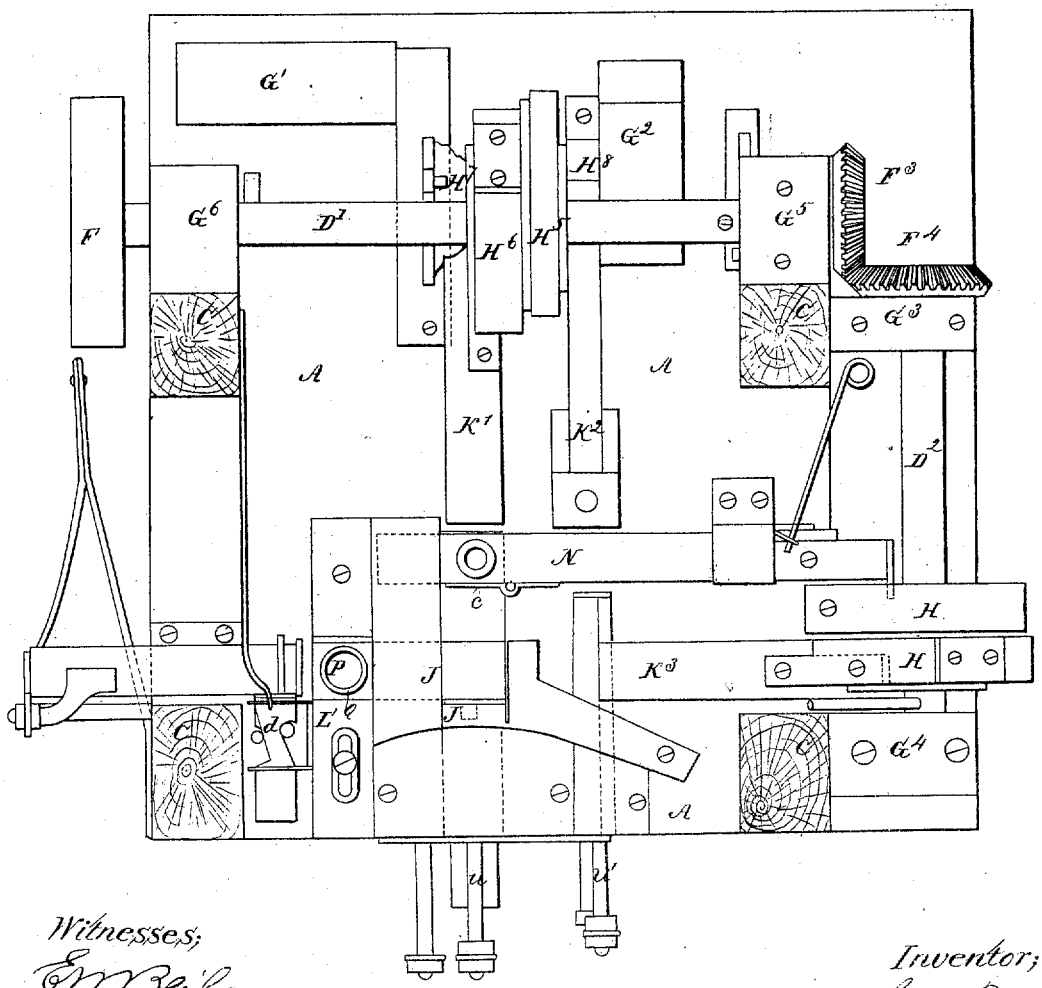
Witnesses;
E. W. Bass
Jeremy W. Bliss
Inventor;
George Dunham

UNITED STATES PATENT OFFICE.

GEORGE DUNHAM, OF UNIONVILLE, CONNECTICUT.

IMPROVEMENT IN MACHINES FOR MAKING NUTS.

Specification forming part of Letters Patent No. 48,383, dated June 27, 1865; Reissue No. 2,324, dated July 31, 1866.

*To all whom it may concern:*

Be it known that I, GEORGE DUNHAM, of Unionville, county of Hartford, and State of Connecticut, have invented certain new and useful Improvements in Nut-Machines; and I do hereby declare that the same is described and represented in the following specification and drawings; and to enable others skilled in the art to make and use the same, I will proceed to describe it construction and operation by referring to the drawings, in which the same letters indicate like parts in each of the figures, the nature of which consists in the peculiar construction and operation of the mechanism whereby I am enabled to size or gage the bar, cut the blank therefrom and bevel its corners, swage its edges, punch the hole, and flatten the face without the use of a forming-pin, so that the nut will be completed while the metal is yet in a heated condition. First, gaging, cutting, holding, and beveling the corners of the blank; second, swaging the edges to form it into proper shape; third, punching the hole or eye of the nut and discharging it from the machine. Thus, after the machine is set in motion and two blanks have been cut from the bar and each blank is passing through a separate and distinct operation, each revolution of the driving-shaft will cut a blank from the bar and discharge a nut from the machine.

In the accompanying drawings, Figure 1 shows a front elevation. Fig. 2 shows a left-hand end elevation. Fig. 3 shows a right-hand end elevation. Fig. 4 shows a back-side elevation. Fig. 5 shows a top or plan view of the bed-plate, having the posts or frame-work broken off and removed, with the mechanism attached thereto.

A is the bed-plate. B are the legs or foundation which support the whole machine. C are the posts or frame-work, made or secured onto the bed-plate, to which the mechanism above the bed-plate is arranged and secured. All of the parts employed, which constitute the frame-work of the machine, are designed to be made of metal proportionate in size and strength to the work which it is designed to accomplish.

D are the driving-shafts. E is the pulley or crank by which the power is applied to the machine. F are gears, each of which are separately designated by Figs. 1, 2, 3, &c., which connect and transmit motion from one to the other of the shafts.

G are studs, posts, or hangers elevated above or hanging below from the bed-plate, to provide bearings or guides for the sliding, revolving, or vibrating parts of the mechanism.

H are cams, each of which are separately designated by Figs. 1, 2, 3, &c. Those marked H H′ $H^2$ are arranged upon the shaft D. (See Fig. 1.) $H^8$ $H^5$ $H^6$ $H^7$ are arranged upon the shaft D′. (See Fig. 4.) $H^3$ $H^4$ are arranged on the shaft $D^2$. (See Fig. 3.)

I is an arm or lever, one end of which is secured in the upper end of the stud G′, and the other end is connected to the punch-bar M by means of arms *a a*. The cam $H^2$ acts upon the upper end of the punch-bar M, to force the punch (in the lower end thereof) through the blank *c* directly under the clearer-bar N, and the cam H′ reacts upon the arm or lever I to draw the punch from the nut after it (the hole in the nut) has been punched, and while the nut is being held firmly in its place by means of the spring-opening in the under side of the clearer-bar N while the punch is being drawn therefrom.

In Fig. 6 the punch-bar M is shown with a removable cap, M′. Between this cap and punch-bar is formed a square-thread screw-socket, *i*, to receive the screw *k*, formed on the upper end of the punch, and to hold the body of the punch *n* firmly between the plate-surfaces of the screw-thread. By the use of this arrangement I am enabled to raise or lower the punch by turning it more or less any desirable distance at a time, and to accurately regulate the point of its action, thereby removing all the difficulty heretofore existing of regulating the position of the punch, after grinding off the face end of the punch, by simply loosening the screws in the front plate, M′.

J are anvil-blocks having passages or openings in the under side to allow the nuts to pass through and for the conveyers to work in.

L is a shear-bar secured to the sliding bar L″, that works in ways formed in the front of the studs or posts G.

L′ is a plate secured in an adjustable manner on the bed-plate in front of and adjusted closely to the face side of the shear-bar L, which two (L and L′) form the shears for cutting the blank for a nut from the bar just after it has been sized in the gage-press.

O is a sizing or gage-press plate operated by an incline plane or wedge, *d*, or its mechanical equivalent, having an arm, *g*, extended back so as to be moved in a given direction to force up the press-plate O to size the bar (placed between it and the back side of the anvil-block J.) By means of an arm, *e*, attached to the shaft D′, said plate not only sizes the iron, but it also operates as a gage to bring and hold the iron in its proper place, from which a nut is cut by the shear-bar L, until after said bar L descends and cuts off a blank-nut and presses it down its thickness below the lower edge of the nut-bar. It also does away with the use of springs (which otherwise would be necessary) arranged one or both sides of the nut or rod from which it is cut.

K are swing swage-hammers for finishing up the nuts. The arms of said hammers K′ $K^2$ are attached to the hanging stud $G^7$, and the arm of the hammer of $K^2$ is hung to the stud $G^2$, all of which are lifted or drawn back in readiness to impart a blow by the cams $H^3$ $H^8$ $H^6$ by the action, respectively, of their springs or their equivalent motive incentives.

P is a spring or yielding table, onto which the blank drops or rests as it is cut from the nut-bar, the bed of which (the table) is arranged nearly in the center of a cone-shaped recess, so that as the shear-bar L cuts the blank from the bar it also continues its motion and presses the blank held between it and the yielding table-bed down into the cone-shape recess Q, thereby forming a bevel on the four corners of the face of the blank nut.

The sliding bar L″, on which the shear-bar L is arranged, is operated downward by the action of the cam H until the blank is cut and pressed; then it recedes a short distance, and remains in that position long enough to allow the blank to be pushed forward by the spring-follower to a point directly under and within the angle or shape of the anvil, and allow the follower R to return to its resting-place, (by the action of a spring or its equivalent,) ready to push the next blank forward; then the cam allows it to rise or recede still more, and remain in that position until the bar is slid forward between the side of the anvil J and the gage or press O, against a gage-block, when the gaging, cutting, and beveling motion is repeated as before. Said blank (now in the angle or shape of the anvil) rests between two spindle-holders, S, the upper one of which, when depressed, fills loosely its bearings; but when lifted, it being (the spindle) made smaller just below its lower bearing allows it to play sidewise more or less without striking the bearings, thus avoiding the injurious effect which otherwise might occur from the blows of the hammers. The blank thus held between the holders is lifted upward directly against the face of the anvil by means of an angular lever, T, which is hung, nearly in the center, to the stud $G^7$, one end of which extends forward, so as to lift the holder S, which is effected by the action of the cam $H^5$ upon the rear end of said lever that extends back and up through the bed-plate. The blank, while in this position, receives two blows from each of the hammers $K^2$ and K′, the holder, still having the blank, drops, by the action of springs or their equivalents, to their starting-point, when the spring push-bar *u*, by the action of the cam $H^7$, moves the blank forward into an opening formed in the under side of the clearer-bar N, directly under the punch, when the punch, by the action of the cam $H^2$, descends and makes the hole in the blank, and is, in turn, lifted from said blank by the joint action of the arm I and cam H′, when the clearer-bar, by the action of the cam $H^4$, draws the nut forward in front of the hammer $K^3$, when the spring push-bar U′ moves the nut from the spring-opening in the clearer-bar back directly under the hammer $K^3$, which, by the action of the cam $H^8$, causes the finishing blow to be given to the face of the nut, which then drops from the machine through an opening formed in the bed-plate of the machine just back of the hammer $K^3$. Thus, as before stated, two nuts are continually in the process of being made and finished after the second blank has been cut from the bar.

I believe I have thus shown and described the important characteristics of this my improvement, so as to enable others skilled to make and use the same therefrom, and so that the utility and advantage to be derived therefrom must be apparent to the mind of a practical mechanic.

What I claim, therefore, and desire to secure by Letters Patent, is—

1. Constructing and arranging the sizing-bar O so as to act in the threefold capacity of sizing, holding, and gaging, actuated by proper mechanism, substantially as and for the purpose described.

2. The combination of the conical-shape recess Q with the spring or yielding table P, substantially as and for the purpose described.

3. The combination of the shearing-punch L with the conical recess Q, substantially as and for the purpose described.

4. The employment of the lifting-holders S S′, substantially in the manner and for the purpose described.

5. The employment of the hammers K′ and $K^2$, or their equivalents, in combination with the holders S S, substantially as and for the purpose described.

6. The clearer-bar N, for holding, clearing, and carrying the nut from one point to another, substantially as described.

7. The screw upon the upper end of the punch K, in combination with the threaded socket *i*, substantially as described.

8. A machine constructed substantially as described, for cutting the blank, forming the bevel, and hammering or finishing the edges of a nut before the punching of the hole, substantially as described.

GEORGE DUNHAM. [L. S.]

Witnesses:

E. W. BLISS,

JEREMY W. BLISS.